Figure 1:
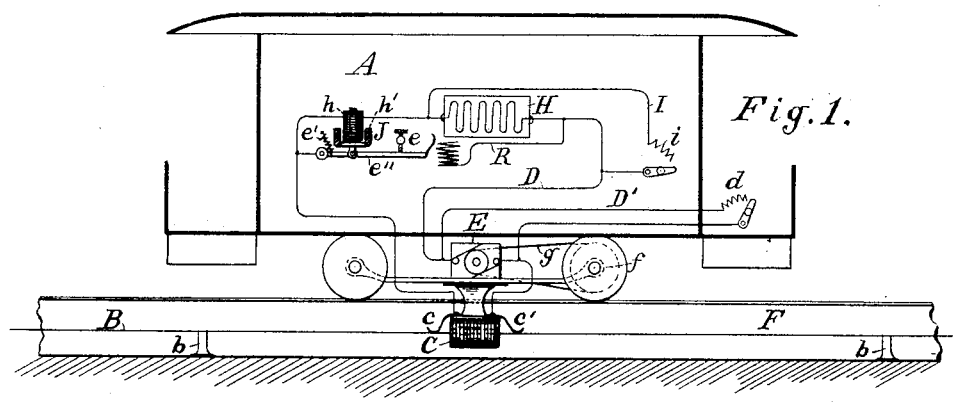

(No Model.)

M. W. DEWEY.
ELECTRIC HEATING APPARATUS FOR ELECTRIC RAILWAY SYSTEMS.

No. 425,757. Patented Apr. 15, 1890.

WITNESSES:
J. J. Laass.
C. L. Bendixon.

INVENTOR:
Mark W. Dewey
BY
Duell, Laass & Duell
his ATTORNEYS

UNITED STATES PATENT OFFICE.

MARK W. DEWEY, OF SYRACUSE, NEW YORK, ASSIGNOR TO THE DEWEY CORPORATION, OF SAME PLACE.

ELECTRIC-HEATING APPARATUS FOR ELECTRIC-RAILWAY SYSTEMS.

SPECIFICATION forming part of Letters Patent No. 425,757, dated April 15, 1890.

Application filed January 27, 1890. Serial No. 338,170. (No model.)

*To all whom it may concern:*

Be it known that I, MARK W. DEWEY, of Syracuse, in the county of Onondaga, in the State of New York, have invented new and useful Improvements in Electric-Heating Apparatus for Railway Systems, of which the following, taken in connection with the accompanying drawings, is a full, clear, and exact description.

My invention relates to electric-heating apparatus for electric railways, and especially electric railways wherein the propelling-motors are connected in the line-working conductor in series or derived circuit.

The main object of my invention is to provide electric-heating apparatus for my series electric-railway system, described and shown in United States Letters Patent No. 419,841, dated January 21, 1890, and other series electric railways, and electric railways employing a constant, or nearly constant, current of varied electro-motive force.

The object of my invention also, is to automatically regulate the current flowing through the heaters independently of the motors.

In a series system of electric railway the electric heaters, or the secondary generators for the heaters, may be connected and maintained in the supply-circuit in series and the current flowing through the heaters automatically regulated. While not absolutely necessary, it is very important that the current flowing through the heater be automatically regulated, especially in railway systems employing a so-called "constant current," as in the series systems, for the electro-motive force of the current is continually varying, and the current, although substantially constant, is fluctuated considerably, and is liable at times to become too strong for the heaters, or of a strength sufficient to fuse the heating devices of said heaters.

To this end my invention consists in the combination, with a series electric railway, or a railway employing a constant or nearly constant current in the supply-circuit, of traveling vehicles, electric motors on said vehicles electrically connected to the supply-circuit, to propel said vehicles, electric heaters to heat said vehicles and connected in the supply-circuit in series, and means to regulate the current flowing through the heaters.

My invention consists, further, and more specifically in the combination, with an electric railway, of a continuous line-working conductor, a vehicle, an electric motor to propel said vehicle, electrical connections between said motor and working-conductor, suitable means to create or locate electrical resistance or counter electro-motive force in said conductor between the connections, an electric heater to heat said vehicle, suitable means for supplying current to the heater from the line-conductor, and an automatic current-regulator on the vehicle to control the current flowing through the heater independently of the motor.

Figure 2:
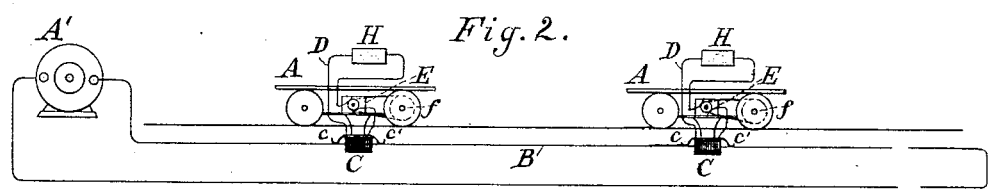
Figure 3:
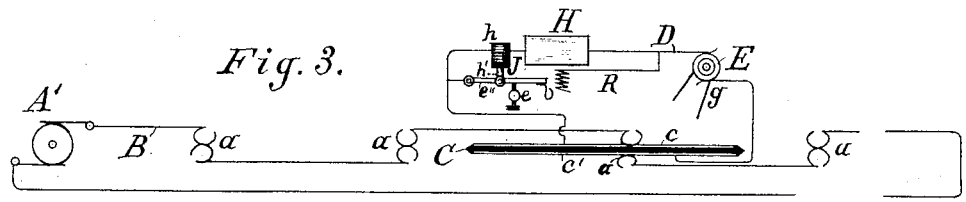
Figure 4:
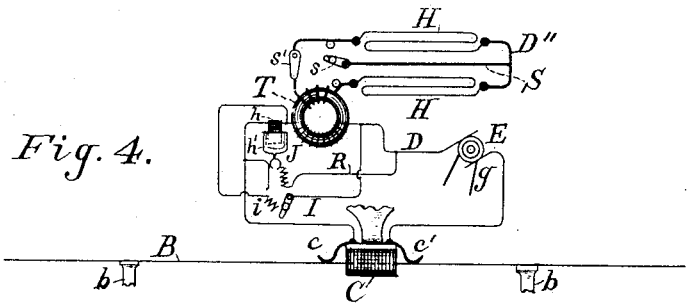
Figure 5:
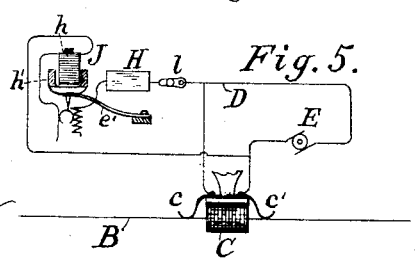

In the accompanying drawings, Figure 1 is a side elevation, partly in section, of an electric railway and a vehicle or motor-car embodying my invention. Fig. 2 is a diagram of an electric railway employing alternating currents and having a permanently continuous working-conductor and showing propelling-motors and electric heaters on vehicles in series or derived circuit. Fig. 3 is a diagram of an electric railway provided with a source of direct current and having a sectional working-conductor with circuit makers and breakers and showing an electric heater in the vehicle-circuit connected to the working-conductor. Fig. 4 is a diagram showing heaters in a secondary circuit of an inductional transformer, and Fig. 5 shows the motor and heater connected in circuit in series multiple and an automatic current-regulator for the heater.

Referring specifically to the drawings, A in the figures represents the vehicle or car; A', the stationary source of electric current or currents for the railway; B, the supply-circuit or line-working conductor connected to the source and arranged along the path of the vehicle or railway and supported on supports or standards *b*.

C is the resistance or counter-electro-motive force device carried by the vehicle.

D is the vehicle circuit or conductor containing the propelling-motor E, and having its terminals connected to the electrical connections or movable contacts c and c'.

H is the heater to heat the vehicle and carried by the same, and J is the automatic current-regulator for the heater.

Referring particularly to Figs. 1 and 2, A' is preferably a source of alternating currents. F represents a slotted underground conduit along the railway and containing the line-working conductor B; and C is the counter-electro-motive-force device located between the collectors or contacts c and c' and fully described in my patent, hereinbefore referred to.

It will be sufficient to say here that the counter-electro-motive-force device opposes the flow of the current more or less in the line between the contacts c and c' and practically converts that portion of the line-conductor into a non-conductor. The effect of this device is to compel the entire current or a portion thereof in the line to flow through the vehicle circuit or conductor D and through any consumption or translating devices contained therein. By means of this device the propelling motors or heaters on the cars are practically included in the line-working conductor or supply-circuit B in series.

In Fig. 2 several vehicles or cars A are shown, having both their propelling-motors and electric heaters connected in the line-circuit in series. The vehicle-conductor D may be termed a "derived circuit."

D' in Fig. 1 is a shunt-circuit around the motor on the vehicle, and contains an adjustable resistance d, to control the current flowing through the motor to regulate its movement; but it will be obvious that the shunt may be dispensed with and the motor controlled, as usual, by shifting its brushes on the commutator. The motor E is shown connected to the driving-axle f by a belt or chain g; but said motor and driving-axle may be, of course, connected together in any other suitable manner.

The heater H, located in conductor D in Fig. 1, may be the same or similar to that shown and described in my application for Letters Patent, filed January 20, 1890, Serial No. 337,452, or any other suitable electric heater.

I is a shunt-path for the current around the heater H, and containing a current-controller or adjustable resistance i, for the purpose of varying the current through the heater, as desired, to control the temperature of the same. When the shunt I is open, as shown, the entire current in the vehicle-conductor flows through the heater; but as the resistance is cut out the current is shunted around the heater, which consequently decreases the heat in the latter.

R is another shunt around the heater, and containing a variable resistance and circuit maker and breaker, forming part of the automatic current-regulator. The helix h is located in direct circuit, or in the vehicle-conductor D, and the armature h' is preferably a ring or cap of metal, and is fixed to the pivoted lever e'' of the regulator, which latter is held in contact with an adjustable stop-screw e by means of the spring e'. As alternating currents are preferably employed in this case, the helix will repel the armature instead of attracting it, and thus move the lever. In the position shown the shunt R is open, allowing all the current to pass through the heater H, assuming that the resistance of said heater is sufficiently low to allow the entire current to pass through it without fusing; but should the strength of the current be much increased, even for an instant, the resistance in the heater would be destroyed or injured without an automatic current-regulator. This regulator maintains the current perfectly constant, and is operated whenever the current becomes too strong. All the current flowing through the heater and the shunt I, when the latter is closed, passes through the helix h, and should the current increase in strength the helix would repel its armature h' and move the pivoted lever e'' of the regulator against the resistance of the spring e' to close the shunt R and cut out resistance in proportion to the increase in the strength of the current.

Referring particularly and briefly to Fig. 3, which is a diagram of an ordinary series electric railway, A' represents preferably a source of direct current. B represents the supply-circuit or line-working conductor cut up into sections of convenient length, the sections being connected together by suitable circuit makers and breakers a a a, which normally complete the circuit through themselves from one section to the other. The circuit makers and breakers are springs attached to the ends of the sections. C is the resistance, in this case located in the working-conductor and passing between the springs and carried by the vehicle, and may consist of a strip of insulating material of suitable length. Strips of metal are fixed to the sides of the insulating-strip and form the electrical connections or movable contacts c and c'. The terminals of the vehicle-conductor D are connected to the said contacts. E is a direct-current motor connected to the vehicle-conductor. The heating apparatus in connection with the vehicle-conductor is the same as that in Fig. 1, with the exception that the helix of the automatic regulator attracts its armature, in this case a core, instead of repelling it.

Referring to Fig. 4, T represents an inductional transformer having its primary coil included in the vehicle-conductor D and its secondary coil in a heating-circuit D'' of lower resistance than the supply-circuit. The heating-circuit includes two low-resistance heaters, which may be the same or similar to that shown and described in my Letters Patent No. 423,223, dated March 11, 1890, and designed to be used in my electric car-heating systems already patented and numbered, respectively, 401,482 and 406,890, or any other suitable form of low-resistance heaters. The heating-circuit is provided with a circuit-breaker s', and a low-resistance shunt S, having a circuit-closer s, for shunting the heating-current around either one of the heaters, if desired. It is intended in some cases to place these heaters one on each side of the car under the seats; but I will not limit myself to these positions. The heating-current in this case is automatically regulated by shunting the current flowing through the primary coil of the transformer T by means of an automatic regulator J, similar to that shown in Fig. 1, and in other respects the figures are substantially alike.

Fig. 5 differs from Fig. 1 only in the fact that the heater to heat the vehicle and the automatic current-controller are in series in a derived circuit around the motor E, and are connected with the motor in the line-working conductor or supply-circuit B in series multiple. I is a circuit-breaker to cut out the heater H and automatic regulator J.

I do not limit myself to the location of the line-working conductor or to the details of construction of other devices shown and described herein, as they may be modified in various ways without departing from my invention.

Having described my invention, what I claim as new, and desire to secure by Letters Patent, is—

1. In an electric railway, a line-working conductor, a vehicle, an electric motor to propel said vehicle, electrical connections between said motor and working-conductor, suitable means to create or locate electrical resistance or counter electro-motive force in said conductor between the connections, an electric heater to heat said vehicle, and suitable means for supplying current to the heater from the line-conductor.

2. In an electric railway, a permanently-continuous line-working conductor, a vehicle, an electric motor to propel said vehicle, electrical connections between said motor and working-conductor, suitable means to create or locate electrical resistance or counter electro-motive force in said conductor between the connections, an electric heater to heat said vehicle, and suitable means for supplying current to the heater from the line-conductor.

3. In an electric railway, a line-working conductor, a vehicle, an electric motor to propel said vehicle, electrical connections between said motor and working-conductor, suitable means to create or locate electrical resistance or counter electro-motive force in said conductor between the connections, an electric heater to heat said vehicle, suitable means for supplying current to the heater from the line-conductor, and an automatic current-regulator on the vehicle to control the current flowing through the heater independently of the motor.

4. In an electric railway employing a constant or nearly constant current in the supply-circuit, traveling vehicles, electric motors on said vehicles connected in the supply-circuit in series to propel the vehicles, electric heaters to heat said vehicles, and suitable means for supplying current to the heaters from the supply-circuit.

5. In an electric railway employing a constant or nearly constant current in the supply-circuit, traveling vehicles, electric motors on said vehicles electrically connected to the supply-circuit to propel the vehicles, and electric heaters to heat said vehicles and connected in the supply-circuit in series.

6. In an electric railway, a supply-circuit extending along the way, traveling vehicles, electric motors on said vehicles electrically connected to the supply-circuit to propel the vehicles, and electric heaters to heat said vehicles and connected in the supply-circuit in series.

7. In an electric railway employing a constant or nearly constant current in the supply-circuit, traveling vehicles, electric motors on said vehicles connected in the supply-circuit in series to propel the vehicles, electric heaters to heat said vehicles, and suitable means for supplying current to the heaters from the supply-circuit, and means to regulate the current flowing through the heaters.

8. In an electric railway employing a constant or nearly constant current in the supply-circuit, traveling vehicles, electric motors on said vehicles electrically connected to the supply-circuit to propel the vehicles, electric heaters to heat said vehicles and connected in the supply-circuit in series, and means to regulate the current flowing through the heaters.

9. In an electric railway, a supply-circuit extending along the way, traveling vehicles, electric motors on said vehicles electrically connected to the supply-circuit to propel the vehicles, electric heaters to heat said vehicles and connected in the supply-circuit in series, and means to regulate the current flowing through the heaters.

10. In an electric railway employing a constant or nearly constant current in the supply-circuit, traveling vehicles, electric motors on said vehicles connected in the supply-circuit in series to propel the vehicles, electric heaters to heat said vehicles, and suitable means for supplying current to the heaters from the supply-circuit, and means to automatically regulate the current flowing through the heaters.

11. In an electric railway employing a constant or nearly constant current in the supply-circuit, traveling vehicles, electric motors on said vehicles electrically connected to the supply-circuit to propel the vehicles, electric heaters to heat said vehicles and connected in the supply-circuit in series, and means to automatically regulate the current flowing through the heaters.

12. In an electric railway, a supply-circuit extending along the way, traveling vehicles, electric motors on said vehicles electrically connected to the supply-circuit to propel the vehicles, electric heaters to heat said vehicles and connected in the supply-circuit in series, and means to automatically regulate the current flowing through the heaters.

13. In an electric railway employing a constant or nearly constant current in the supply-circuit, traveling vehicles, electric motors on said vehicles electrically connected to the supply-circuit to propel the vehicles, electric heaters to heat said vehicles and connected in the supply-circuit in series, and means to control the current flowing through the heaters independently of the motors.

14. In an electric railway, a supply-circuit extending along the way, traveling vehicles, electric motors on said vehicles electrically connected to the supply-circuit to propel the vehicles, electric heaters to heat said vehicles and connected in the supply-circuit in series, and means to control the current flowing through the heaters independently of the motors.

15. In an electrically-propelled vehicle provided with a motor arranged to employ a constant or nearly constant current of varied electro-motive force, an electric heater carried by the vehicle to heat the same, a circuit on the vehicle including said motor and heater, and means to regulate the current flowing through the heater independently of the motor.

16. In an electrically-propelled vehicle provided with a motor arranged to employ a constant or nearly constant current of varied electro-motive force, an electric heater carried by the vehicle to heat the same, a circuit on the vehicle including said motor and heater, and means to automatically regulate the current flowing through the heater independently of the motor.

17. In an electrically-propelled vehicle provided with a motor arranged to employ a constant or nearly constant current of varied electro-motive force, an electric heater carried by the vehicle to heat the same, a circuit on the vehicle including said motor and heater in series, and means to automatically regulate the current flowing through the heater independently of the motor.

18. In an electric railway, a line-working conductor, a traveling vehicle, an electric motor to propel said vehicle, an electric heater carried by the vehicle to heat the same, an electrical connection between the vehicle and working-conductor to supply current, and means to automatically regulate the current flowing through the heater independently of the motor.

19. In an electric railway, a line-working conductor supplied with a constant or nearly constant current, traveling vehicles, electric motors on said vehicles connected in the line-conductor in series to propel the vehicles, electric heaters to heat said vehicles, and suitable means for supplying current to the heaters from the line-conductor.

In testimony whereof I have hereunto signed my name this 25th day of January, 1890.

MARK W. DEWEY. [L. S.]

Witnesses:
C. H. DUELL,
C. L. BENDIXON.